United States Patent
Nankumo

(10) Patent No.: US 7,131,129 B2
(45) Date of Patent: Oct. 31, 2006

(54) OBJECTIVE LENS DRIVER AND OPTICAL MEMORY DEVICE

(75) Inventor: Nobuyuki Nankumo, Kumagaya (JP)

(73) Assignee: Fujitsu Limited, Kawasaki (JP)

( * ) Notice: Subject to any disclaimer, the term of this patent is extended or adjusted under 35 U.S.C. 154(b) by 547 days.

(21) Appl. No.: 10/403,602

(22) Filed: Mar. 31, 2003

(65) Prior Publication Data

US 2004/0022167 A1    Feb. 5, 2004

(30) Foreign Application Priority Data

Jul. 31, 2002 (JP) .............................. 2002-224224

(51) Int. Cl.
*G11B 17/00* (2006.01)
(52) U.S. Cl. .................. 720/683; 369/44.22
(58) Field of Classification Search ............... 720/682, 720/683, 684; 369/44.22
See application file for complete search history.

(56) References Cited

U.S. PATENT DOCUMENTS

| | | | | |
|---|---|---|---|---|
| 4,554,653 A | * | 11/1985 | Malissin et al. | 720/683 |
| 4,570,249 A | * | 2/1986 | Malissin et al. | 369/44.22 |
| 5,128,806 A | * | 7/1992 | Ohno | 369/44.15 |
| 5,317,552 A | * | 5/1994 | Yamasaki | 369/44.14 |
| 6,532,199 B1 | * | 3/2003 | Getreuer et al. | 369/44.22 |
| 6,628,601 B1 | * | 9/2003 | Kobayashi | 720/683 |

FOREIGN PATENT DOCUMENTS

| | | |
|---|---|---|
| JP | 11-144270 | 5/1999 |
| JP | 2000-285493 | 10/2000 |
| JP | 2000-339722 | 12/2000 |

* cited by examiner

*Primary Examiner*—William Korzuch
*Assistant Examiner*—Christopher R. Magee
(74) *Attorney, Agent, or Firm*—Greer, Burns, & Crain, Ltd.

(57) ABSTRACT

An objective lens driver and an optical memory device with the respective polarities of magnetic circuits used for the focusing and tracking operations are set such that a repulsive force works in a direction opposing the gravitational force. Respective differing polarities of a pair of magnetic circuits used for focusing face each other, and respective differing polarities of a pair of magnetic circuits used for tracking also face each other.

7 Claims, 9 Drawing Sheets

REPULSIVE FORCE

OBJECTIVE LENS DRIVER AND OPTICAL MEMORY DEVICE

BACKGROUND OF THE INVENTION

1. Field of the Invention

This invention pertains to an optical memory device that uses a lens drive mechanism equipped with drive coils and magnetic circuits composed of magnets, etc., in order to drive an objective lens.

2. Description of the Related Art

Previously, well-known forms of magneto-optical memory devices have existed in which a magneto-optical disk equipped with a perpendicular magneto-optical recording film is used as a recording medium. These types of magneto-optical memory devices contain a magneto-optical disk that is rotated by a disk rotation drive mechanism, and the main surface of one side of this disk is equipped with electromagnets that are installed in an opposing fashion for the purpose of applying a bias magnetic field. The main surface of the other side of this disk is equipped with, optical pickup devices, also installed in an opposing fashion, for the purpose of irradiating a light beam.

In order for a writing process to be conducted onto the recording film of this magneto-optical memory device, a light beam strength is raised to an erasure power level, and an erasure field is applied to the magneto-optical disk in the erasure direction (which is nearly perpendicular to the medium and nearly parallel to the optical axis), such that an erasing operation is conducted over the specified area. Then, while the optical beam is modulated in response to the recording data signal that is supposed to be at the recording power level, a recording field, which has a reverse orientation with respect to the erasure field, is applied to the aforementioned specified area. This causes various shifts to occur in the magnetization direction of the magneto-optical disk, resulting in the recording of the data signals onto the aforementioned specified area.

In recent years, 3.5-inch magneto-optical disks have been able to achieve a storage capacity of 2.3 GB. And along with this move toward higher density, there has been a need for smaller recording marks as well as the formation of recording pits. For this reason, there has been a move toward smaller laser beam diameters as well as high numerical aperture ("NA"), resulting in the need for a closer distance between the optical memory medium and the objective lens. The closer distance, however, has resulted in problems due to magnetic effect on the optical memory medium as a result of magnetic flux leakage from the objective lens driver.

Furthermore, a sudden drop in costs, reduction in the number of parts, and greater demand for high-speed access have led to a need for simpler and smaller designs in the lens drivers used to drive objective lenses, as well as the carriage drivers that are used to move the lens drivers in specified directions of the optical memory medium.

Also, in the case of optical memory devices in which a power source is delivered from a host device through an interface, the amount of power that can be delivered is restricted according to the type of interface used, thus increasing the demand for a shift toward lower power consumption.

Accordingly, the objective of this invention is to provide an objective lens driver and an optical memory device that are designed with improved magnetic circuit constructions for the focusing and tracking operations of the objective lens driver, and in such a way as to reduce the level of power consumption.

SUMMARY OF THE INVENTION

According to the present invention, an objective lens driver includes at least a lens holder that holds an objective lens, a lens actuator that supports the lens holder such that the lens holder can be moved in a parallel direction with respect to the optical axis of the objective lens, a first pair of drive coils that generate a drive force to move the objective lens in the parallel direction with respect to the optical axis, a first pair of magnetic circuits that are installed to face the first drive coils, a lens carriage in which the lens actuator and at least one of the pair of first magnetic circuits are mounted, a second pair of drive coils that generate a drive force to move the lens carriage in a relatively perpendicular direction with respect to the optical axis, and a second pair of magnetic circuits that are installed to face the second pair of drive coils. The respective polarities of the first and second magnetic circuits may be set such that a repulsive force works in a direction opposing gravitational force. Additionally, respective differing polarities of the pair of first magnetic circuits may be set to face each other, and respective differing polarities of the second pair of magnetic circuits may also be set to face each other.

According to a preferred embodiment of the present invention, an optical memory device includes a lens holder that holds an objective lens, a lens actuator that supports the lens holder such that the lens holder can be moved in a parallel direction with respect to the optical axis of the objective lens, at least two first drive coils that generate a drive force to move the objective lens in the parallel direction with respect to the optical axis, at least two first magnetic circuits that face the first drive coils, a lens carriage in which the lens actuator and at least one of the first magnetic circuits are mounted, at least two second drive coils that generate a drive force to move the lens carriage along a surface of an optical memory medium, and at least two second magnetic circuits that face the second drive coils. Furthermore, respective polarities of the first and second magnetic circuits are set up such that a repulsive force works in a direction opposing a gravitational force. Additionally, the respective differing polarities of the first magnetic circuits may face each other, and the respective differing polarities of the second magnetic circuits may also face each other.

Furthermore, the first two magnetic circuits are preferably a pair respectively set up with an S-pole and N-pole in the parallel direction with respect to the optical axis, and the second two magnetic circuits are a pair of respectively set up with an S-pole and N-pole in the perpendicular direction with respect to the optical axis.

Also, the optical memory device is preferably constructed in the form of a magneto-optical memory device equipped with a magnetic field applicator that provides a magnetic field in the perpendicular direction with respect to the surface of the magneto-optical memory medium.

Accordingly, when a force is achieved in the direction opposite to the gravitational force affecting the lens carriage, thus resulting in a lifting force for the lens carriage, the amount of wear on the carriage support mechanism (e.g., guide rails, magnetic circuit yoke for the track, etc.) is alleviated, making it possible for the lens carriage to move smoothly with only a low level of drive power being required.

Additionally, given the fact that the magnetization direction of the magnetic flux leakage from the objective lens driver is nearly parallel with respect to the memory medium surface along the top of the memory medium surface, it is possible to reduce the magnetic effect on optical memory media, particularly in the case of magneto-optical memory media of the perpendicular magnetic recording type. Furthermore, since the relative magnetic flux leakage of the magnetic circuit used for focusing and the relative magnetic flux leakage of the magnetic circuit used for tracking cancel each other out, it is possible to reduce the amount of magnetic force that is applied to the memory medium.

Even further, during recording, erasure, etc., there would be no longer a need to set the amount of magnetic field provided to the magneto-optical memory medium to an amount considered for the magnetic flux leakage portion from the objective lens driver, thereby making it possible to reduce the amount of electrical power needed for the magnetic field applicator to generate the magnetic field. As a result, it is possible to provide a magneto-optical memory device with a lower level of power consumption.

Although the reduction in the amount of power consumption achieved as a result of this invention may seem relatively slight as compared to the overall consumption amount, even the slightest reduction can have a remarkable and advantageous effect on magneto-optical memory devices in cases where the power source is provided from the host device through an interface, or when a battery is used to drive the device.

Furthermore, it is expected that this invention will be able to provide a multiplier effect when the aforementioned operational results are combined.

DETAILED DESCRIPTION OF THE INVENTION

Figure 1:
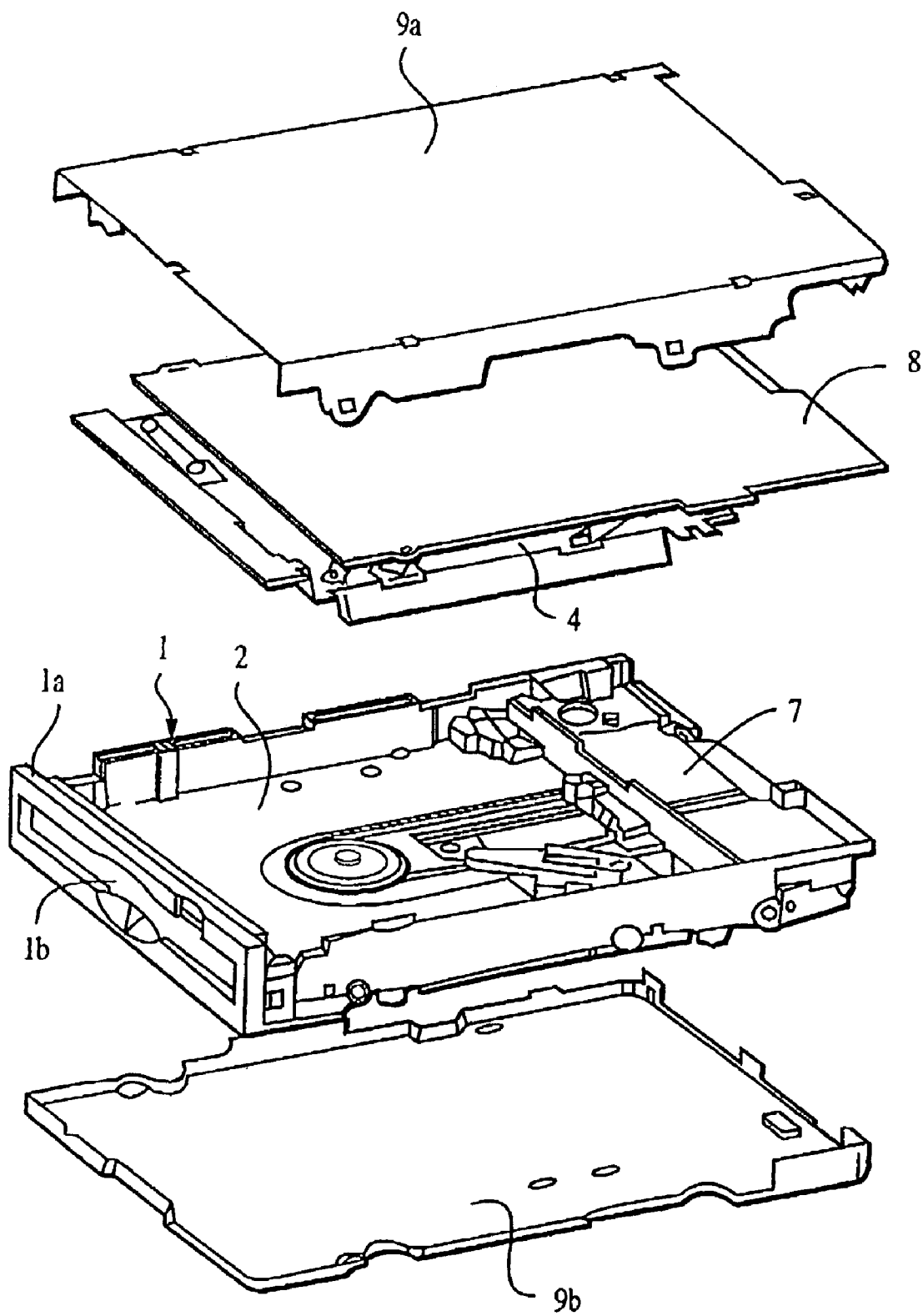
FIG. 1 is an oblique view of a magneto-optical disk device in a disassembled state.
Figure 2:
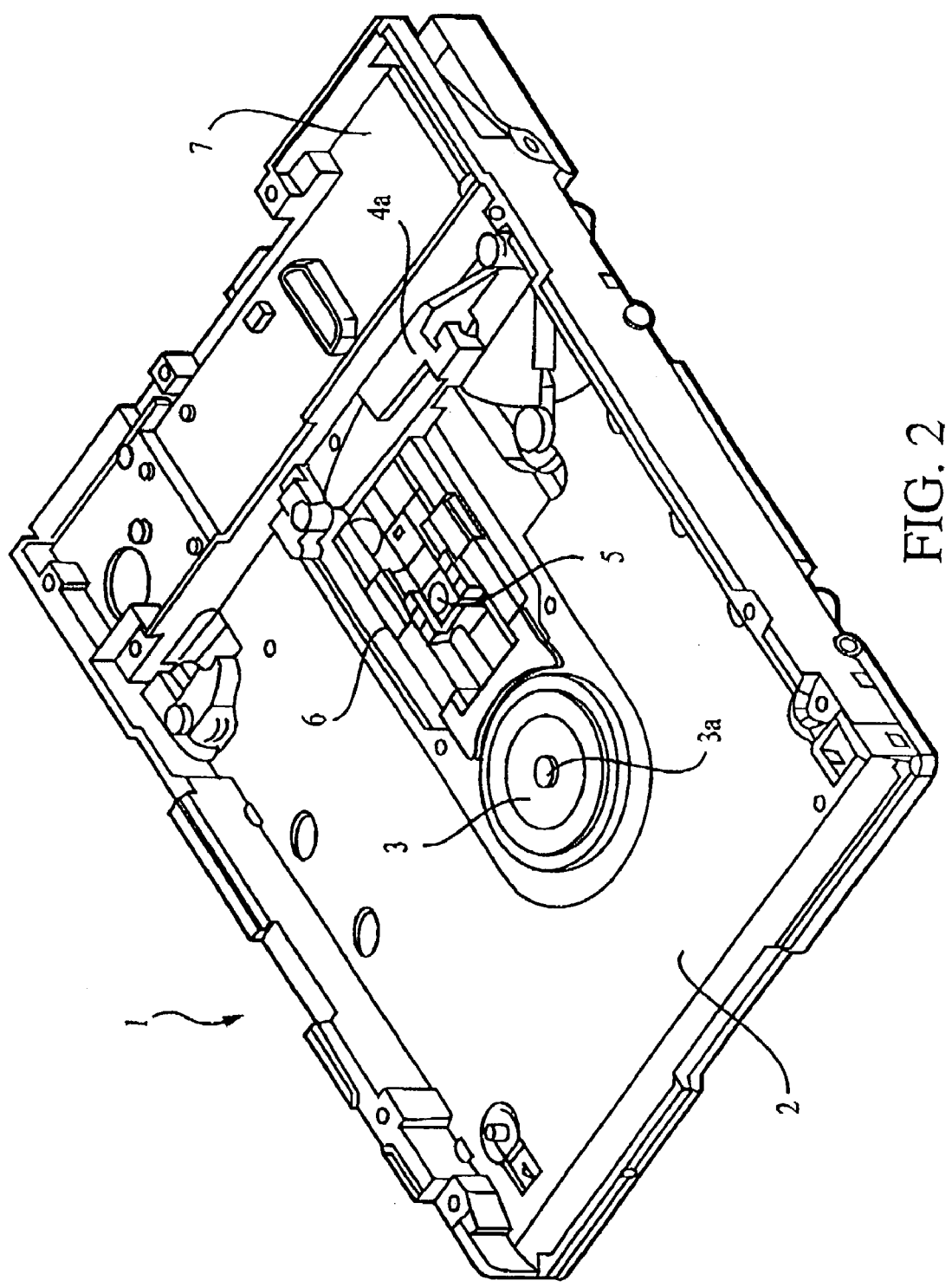
FIG. 2 is an expanded oblique view of the base assembly.

FIGS. 1 and 2 provide an expanded oblique view of the magneto-optical disk device according to the present invention. The magneto-optical disk device is composed of a magneto-optical disk cartridge that contains the magneto-optical disk 21 (best seen in FIG. 4), which can be inserted and ejected such that the magneto-optical disk can be used to record, erase, or play back data. Furthermore, this magneto-optical disk device not only provides a means for data recording and/or playback, etc., but it can also be used as a dedicated host, a testing device for magneto-optical disks through the use of a program, or a media processing device.

In the drawings, a base 1 is preferably formed from a metal such as aluminum, and one end of an indented storage portion 2 is equipped with a front bezel 1a. The front bezel 1a is equipped with an insertion/ejection port (not numbered) through which cartridges are inserted and ejected, and a door 1b that can open and close is attached to the insertion/ejection port. The storage portion 2 is an empty space in which a cartridge holder 4 is located. A print circuit substrate 8, which is equipped with an interface circuit, a control circuit, etc. (not shown), and the cover 9a are located on the top of the base 1. Another cover 9b is located below the base 1.

An objective lens actuator is equipped with a turntable 3 and an objective lens 5, as well as the carriage drive mechanism 6, etc., which are all positioned above the base 1 to match against an open portion of a disk cartridge (not shown).

When the cartridge is inserted into its specified loading position, a shutter mechanism (not shown) opens a shutter that is installed onto the cartridge, thereby allowing the magneto-optical disk to become exposed. A center hole (not shown) of the magneto-optical disk 21 meets with a center protrusion 3a on the turntable 3, as best seen in FIG. 2. Once the turntable 3 is loaded as such, a magneto-chucking operation occurs on the turntable 3, where a magnetic hub (not shown) of the magneto-optical disk contains magnets. Through the action of a rotation mechanism, which includes a spindle motor (not shown), the turntable 3 is rotated at a specified rpm.

The stationary optical system 7 is equipped with a laser diode and various laser parts that are loaded on a head base (not shown). The head base is either formed as a unit with the base 1 or is formed separately and joined to the base 1. The laser diode emits a laser beam L in response to a drive signal that is delivered from a head circuit substrate. The laser beam L that is emitted from the head base window of the stationary optical system 7 directly enters the lens carriage window 10h. The laser beam L, which is emitted from the stationary optical system 7, which is to say, from a relatively parallel direction with respect to the surface direction of the magneto-optical disk 21, is reflected by a mirror (not shown) such that its direction changes to a relatively perpendicular direction, after which it passes through the objective lens 5 and is irradiated onto the magneto-optical disk 21.

The objective lens 5 is held in place by a lens holder 5a, and the lens actuator conducts a focusing control operation in which displacement occurs in a perspective direction of the disk, which is to say in a slightly parallel direction with respect to the optical axis of the objective lens 5, such that the laser beam L is focused onto a magnetic film of the disk 21 in order for recording/playback of the magneto-optical disk 21 to occur.

Furthermore, while the objective lens 5 on top of a carriage 10 conducts a tracking control operation so that the laser beam L scans over the specified tracks that are formed along the magneto-optical disk 21, the lens 5 also conducts a seek control operation in which the laser beam L is moved in the radial direction (crosswise direction of the tracks) of the magneto-optical disk 21 in order to position itself over a specified track.

Note that in this preferred embodiment, a voice coil motor (not shown) is preferably used as an actuator to combine a seek actuator drive mechanism with a tracking actuator drive mechanism. Also note, however, that the present inventors contemplate that it is possible to separately install a seek actuator drive mechanism and a tracking actuator drive mechanism.

The laser beam L that is irradiated onto the magneto-optical disk 21 from the carriage 10 is reflected by the magneto-optical disk 21. The carriage 10 then delivers the light that is reflected by the magneto-optical disk 21 to the stationary optical system 7 in the form of a return light beam.

The return light beam is then sent to a detector (not shown) that is installed in the stationary optical system 7 in order to detect data signals (magneto-optical signals/pit signals), and then converted to an electric signal.

The return light beam is also sent to a detector (not shown) that is installed in the stationary optical system 7 in order to detect focusing errors, and then also converted to an electric signal. The return light beam is further also sent to a detector (not shown) that is installed in the stationary optical system 7 in order to detect tracking errors, and also converted to an electric signal. The signals that are converted by the signal detector, the focusing error detector, and the tracking error detector are magnified by a head amplifier (not shown), after which they are sent to the print circuit substrate 8.

Figure 3:
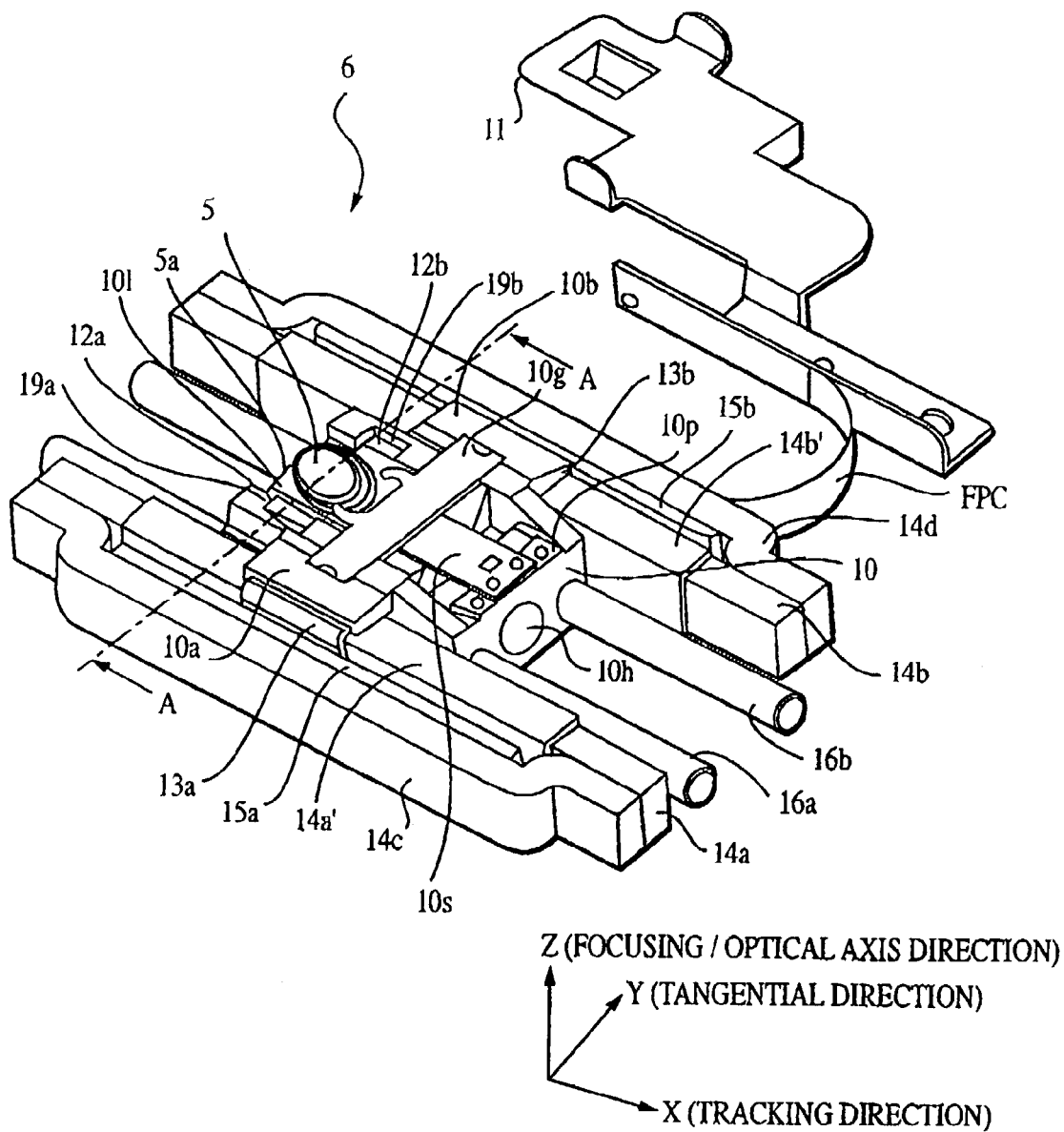
FIG. 3 is an expanded plan view of the lens carriage mechanism.
Figure 4:
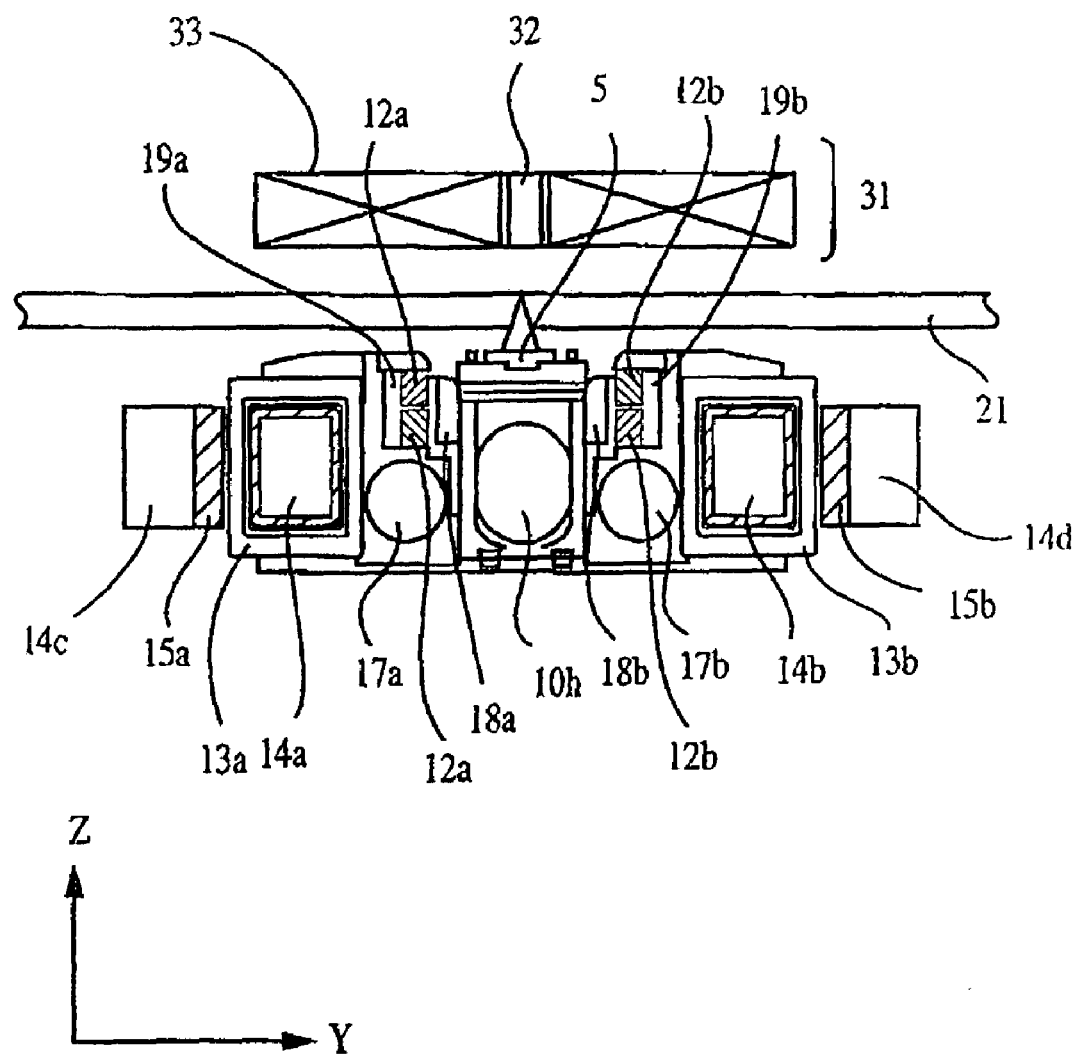
FIG. 4 is a cross-sectional diagram of View A—A of the lens carriage mechanism.

Now referring to FIGS. 3 and 4, a storage portion 2 of the base contains a movement mechanism that is used in order to move the lens carriage 10 over the disk surface. The movement mechanism is composed of sliding bearings, a pair of guide rails to the left and right, a pair of magnetic circuits to the left and right, and a pair of coils to the left and right, as described below.

Two guide rails 16a and 16b extend in the radial direction of the disk (crosswise direction of the tracks) and are installed in a slightly parallel fashion with respect to the disk surface. The guide rails 16a and 16b are respectively fit into holes 17a and 17b of the carriage 10 in order to provide support for the carriage 10. Each end of the two guide rails 16a and 16b is held in place by being inserted into a securing wall portion (not shown) of the base 1, which contains steps that the rails are held against through the use of four leaf springs (not shown) that are installed onto both ends of the storage portion 2.

The two magnetic circuits that are installed in a slightly parallel fashion with respect to the radial direction of the disk (the moving direction of the carriage) are composed of magnets 15a and 15b, and yokes 14a, 14b, 14c, and 14d. Each side of the carriage 10 is equipped with a coil holder 10a and 10b, where two coils 13a and 13b are embedded into positions that face the yokes 14a and 14b respectively. The surfaces of the two yokes 14a and 14b are preferably covered with copper pipes 14a' and 14b' that are used in order to counter excessive current, thereby providing for rapid startup of coil current, making it possible to achieve high-speed access.

The magnetic circuit and coil make a voice coil motor (VCM), and when current is sent to the coil, the carriage 10 is guided smoothly along the guide rails 16a and 16b through the combined action of drive force and the sliding bearings, thus allowing the carriage 10 to move in the radial direction of the magneto-optical disk (crosswise direction of the tracks). Note that, in the case of this preferred embodiment, sliding bearings are used as an example. However, it is acceptable to use other types of bearings such as ball bearings, etc.

The objective lens 5, which causes the respective light beams to converge on top of the disk 21 is mounted onto the lens holder 5a. The lens holder 5a is installed onto the free ends of two parallel leaf springs 10s that are positioned one above the other. The parallel leaf springs 10s hold the lens holder 5a so that it can move up and down in the direction of the optical axis of the objective lens 5. In addition, a regulator plate 10g is installed for the purpose of keeping the movement of the parallel leaf springs 10s from exceeding a specified movement in the direction of the disk. Ends of the parallel leaf springs 10s are secured and bonded to a carriage fitting 10p.

The top of the carriage 10 on each side of the lens holder 5a is equipped with a magnetic circuit composed of magnets 12a and 12b, as well as yokes 19a and 19b. The sides of the lens holder 5a are equipped with coils 18a and 18b that face the magnetic circuit. This configuration provides a lens actuator 101 that makes it possible to move the lens holder 5a, that is to say, the objective lens 5, in the focusing direction.

One end of a flexible printed circuit ("FPC") board is connected to the printed circuit substrate and is held onto the top of the base 1 using an FPC holder 11, such that the FPC holder 11 is prevented from getting caught up in the movement of the carriage 10. The other end of the FPC holder 11 is held onto the top of the carriage 10 and is connected to the focusing drive coils 18a and 18b as well as the tracking drive coils 13a and 13b in order to provide drive signals.

A bias magnetic field applicator 31 is located in a position that corresponds to a released portion of the magneto-optical disk cartridge shutter on top of the cartridge holder 4. In other words, the applicator 31 is placed such that the magneto-optical disk 21 is held between it and the objective lens 5, with the objective lens 5 facing the applicator 31. The bias magnetic field applicator 31 is constructed of an electromagnet that is composed of a coil 33 and a yoke 32. When an electric current is sent to the coil 33, a magnetic field is generated from the yoke 32 and applied to the magneto-optical disk 21. Furthermore, the bias magnetic field applicator 31 can apply a magnetic field to the magneto-optical disk 21 based on instructions from the control circuit when there is a need for data to be recorded, erased, or played back.

Figure 5A:
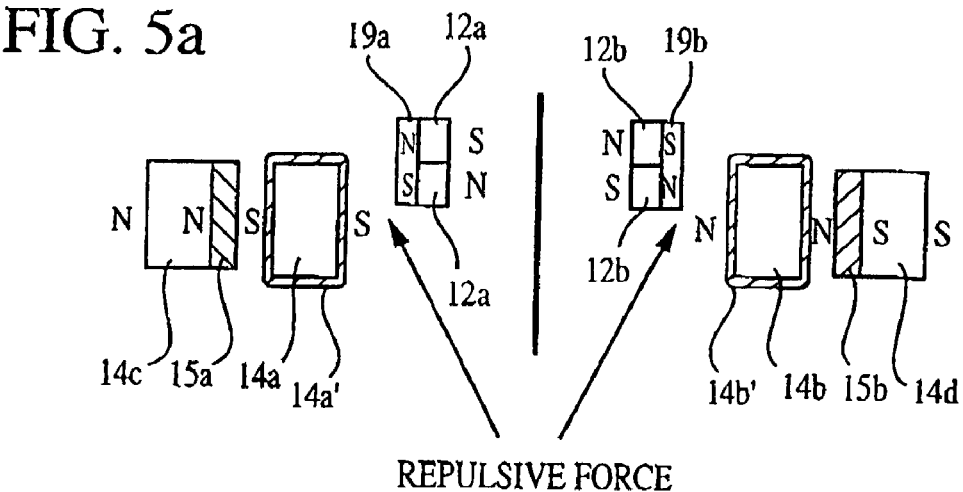
FIG. 5A is a layout drawing of the magnetic circuits used for focusing and tracking.
Figure 5B:
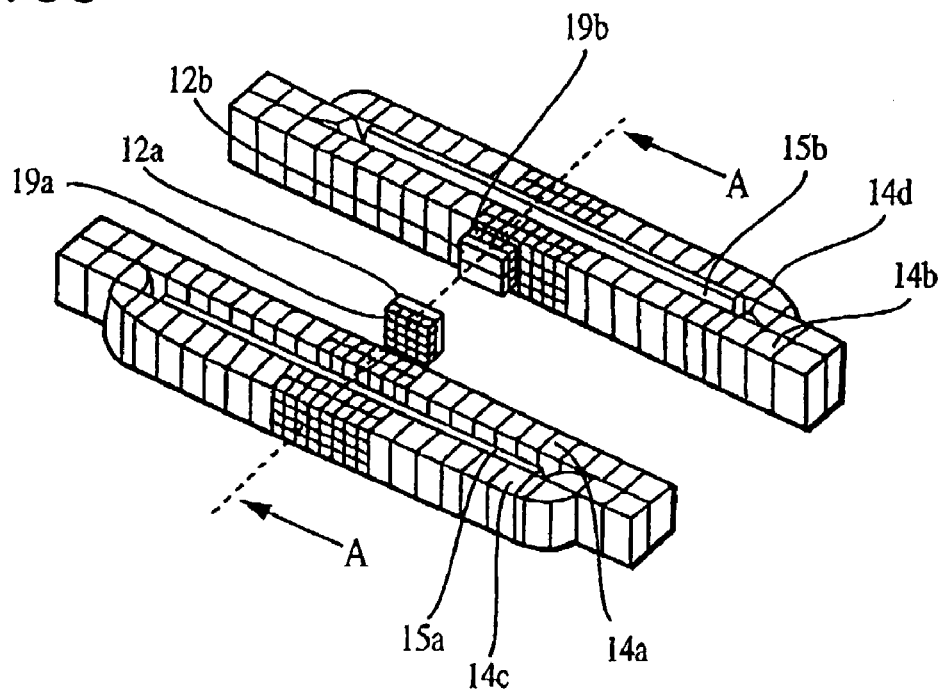
FIG. 5B is a layout drawing of the magnetic circuits used for focusing and tracking.

Now referring to FIGS. 5A and 5B, the magnetic circuit for tracking contains preferably end portions (not numbered) in which the yokes 14a and 14c are attached to each other on one end, and the yokes 14b and 14d are attached to each other on the other end. Yokes 14c and 14d preferably contain bends on each end that provide spaces (not numbered, best seen in FIG. 5B) for the placement of the magnets 15a and 15b, as well as the coils 13a and 13b. These spaces can be used such that one end of the coils 13a and 13b can move, and since the carriage 10 is designed to move, the mobility range of the carriage determines the lengths of these spaces.

In sequence from the left side of FIG. 5A, the yoke 14c for the tracking magnetic circuit is adhered to the magnet 15a, and the yoke 14a is placed in a position such that it faces an open space. The yoke 19a and magnet 12a used for focusing are placed to the top of the yoke 14a (in the direction approaching the disk) such that they are offset from the yoke 14a. With a space in between that is used to place the lens holder 5a, the magnet 12b and yoke 19b used for focusing are placed in sequence in a position that faces the yoke 19a and magnet 12a of the magnetic circuit used for focusing. The magnet 15b and yoke 14d of the magnetic circuit used for tracking are placed below the yoke 19b (in the direction away from the disk) such that they are offset from the yoke 19b.

In sequence from the left side of FIG. 5A, N-poles are located to the left and right of the yoke 14c for the magnetic circuit used for tracking. An N-pole is located to the left of the magnet 15a that is adhered to the yoke 14c, and an S-pole is located to the right. S-poles are also located to the left and right of the yoke 14a. An N-pole is located on the top of the yoke 19a of the magnetic circuit used for focusing, and an S-pole is located on the bottom. An S-pole is located on the top of the magnet 12a that is adhered to the yoke 19a, and an N-pole is located on the bottom. Furthermore, an N-pole is located on the top of the magnet 12b of the magnetic circuit used for focusing, and an S-pole is located on the bottom. An S-pole is located on the top of the yoke 19a, and an N-pole is located on the bottom. N-poles are also located to the left and right of the yoke 14b of the magnetic circuit used for tracking. An N-pole is located to the left of the magnet 15b that is adhered to the yoke 14b, and an S-pole is located to the right. S-poles are also located to the left and right of the yoke 14d.

Accordingly, repulsive force works between the S-pole of the yoke 14a and the S-pole of the yoke 19a, as well as between the N-pole of the yoke 14b and the N-pole of the yoke 19b. In particular, the center of the magnetic circuit used for focusing and the center of the magnetic circuit used for tracking become offset in the direction of the optical axis of the objective lens, or in the direction approaching the disk. This causes an offset to occur in a direction opposing gravitational force, thus making it possible to obtain a component for the directional force that opposes the gravitational force.

Note that this preferred example illustrates an offset movement in the direction of the optical axis between the center of the magnetic circuit used for tracking and the center of the magnetic circuit used for focusing. Even without a significant amount of offset, the fact that the magnets and yokes of the magnetic circuit used for focusing have S-poles and N-poles in the vertical direction (the direction of the optical axis), as well as the fact that the magnets and yokes of the magnetic circuit used for tracking have S-poles and N-poles in the horizontal direction (the direction perpendicular to the optical axis), means that it is possible for a repulsive force to occur in a direction opposite the gravitational force between the polarity that exists below the magnetic circuit used for focusing and the matching polarity that exists in the circuit used for tracking. Compared to cases in which no offset occurs, there is a larger repulsive force when an offset does occur, which points to a more effective and advantageous outcome for this preferred embodiment.

Using a working force in a direction opposing the gravitational force through the repulsive force (resiliency) of these magnetic circuits, the force that is exerted toward the support mechanisms, such as the guide rails and yokes, is weakened, and a lifting force is generated that causes a reduction in the frictional force that occurs as a result of the sliding action of the carriage. Accordingly, it becomes further possible to provide high-speed carriage movement as well as a savings in the amount of energy needed to drive the carriage.

Furthermore, the magnets 15a and 15b of the magnetic circuit used for tracking, or the yokes 14a and 14b, or 14c and 14d, have different polarities and are arranged to face each other with the carriage 10 between them. Likewise, the magnets 12a and 12b of the magnetic circuit used for tracking, or the yokes 19a and 19b, have different polarities and are arranged to face each other with the lens holder 5a between them. This preferred configuration makes it possible for magnetic flux leakage of the magnetic circuit used for focusing and magnetic flux leakage of the magnetic circuit used for tracking to cancel each other out.

As a result of this preferred configuration, it is possible to reduce the amount of magnetic flux leakage that is presented to the optical memory medium.

Figure 6A:
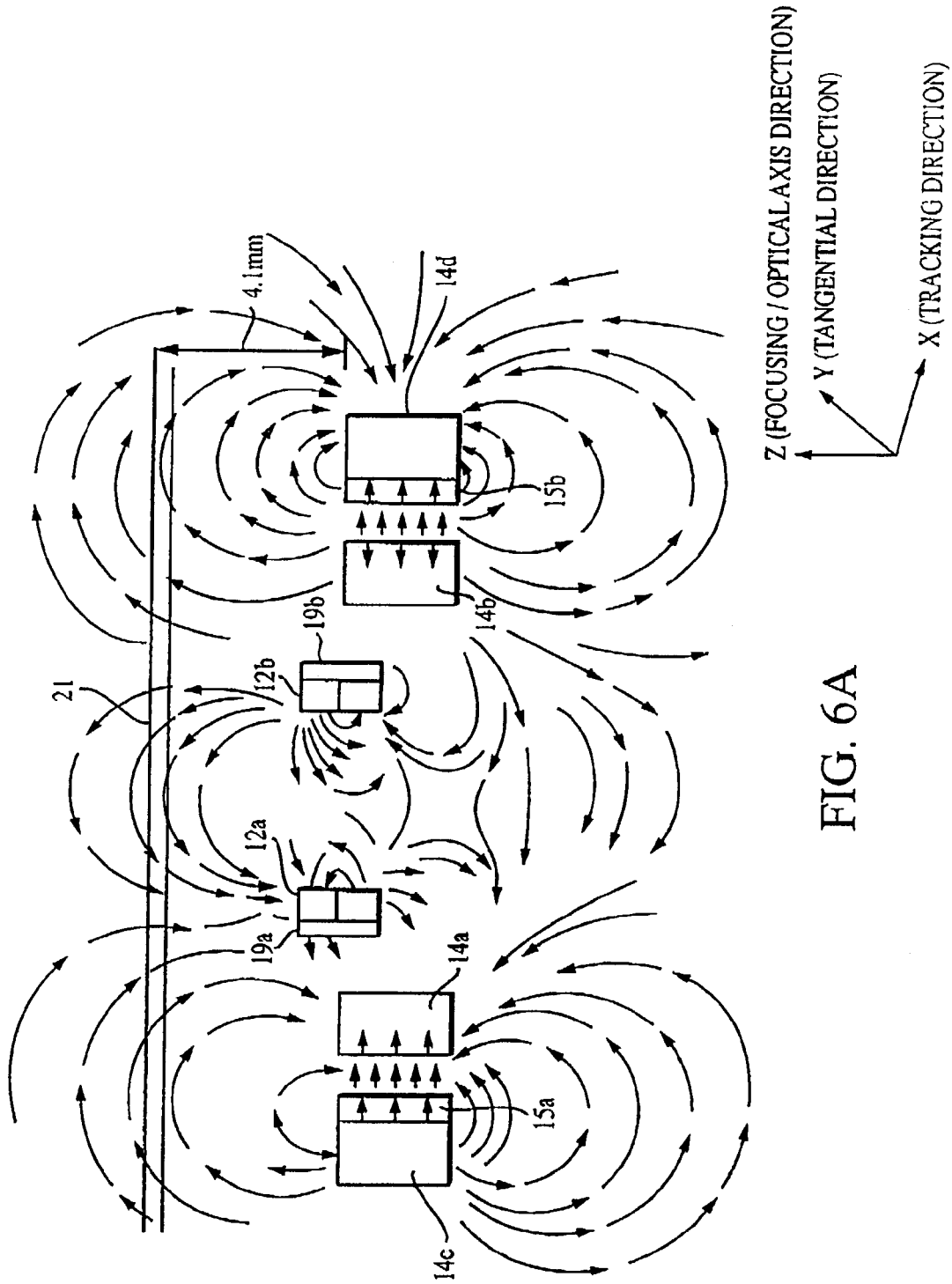
FIG. 6A is a drawing that illustrates the condition of the magnetic flux leakage of the magnetic circuits used for focusing and tracking.
Figure 6B:
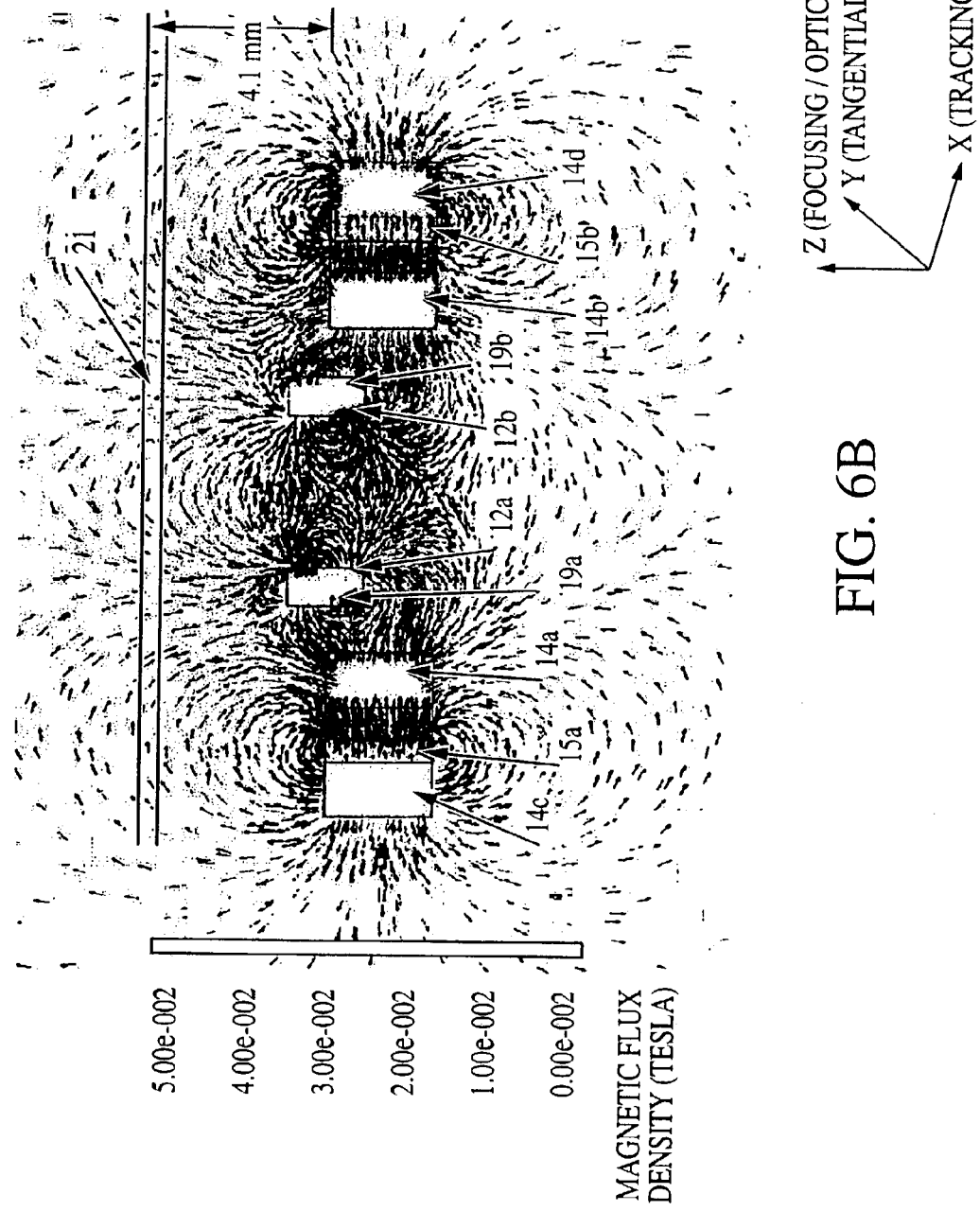
FIG. 6B is a drawing that illustrates the condition of the magnetic flux leakage of the magnetic circuits used for focusing and tracking.

Now referring to FIGS. 6A and 6B, in the peripheral areas of the magneto-optical disk 21 where the light beam L is irradiated onto the recording film, the direction of the magnetic force lines due to the magnetic flux leakage is nearly horizontal with respect to the surface of the magneto-optical disk 21 (in other words, the direction of the magnetic force lines due to the magnetic flux leakage do not go in the focusing direction or the direction of the optical axis), and this composition results in a near lack of influence on the magnetic area from the bias magnetic field applicator 31, which is nearly perpendicular to the surface of the magneto-optical disk 21.

In other words, the size of the magnetic flux leakage that is parallel to the optical axis is 0–10 Oe (oersted), which to say that it is held at $0-10 \times 10^3/4\pi$ (79) A/m, and as a result, it is possible for a bias magnetic field generator to produce only the magnetic field necessary for recording, erasing, or playing back data. As such, there is no longer a need to carry over the magnetic field generation portion for the sake of eliminating the effects of the magnetic flux. As a result, it becomes possible to reduce the level of electrical power required when a bias magnetic field generator is used to generate a magnetic field.

Note that FIG. 6A shows an illustrative sketch of the direction of the magnetic flux in the area of each magnetic circuit, and FIG. 6B illustrates the actual strength of the magnetic flux in the area of each magnetic circuit. The drawings show that the magnetic flux leakage of the magnetic circuit used for focusing and the magnetic flux leakage of the magnetic circuit used for tracking cancel each other out, and that the level of strength of the magnetic flux is low as it moves toward the optical memory medium. It can also be seen that the direction of the magnetic flux in the area that is relatively near the objective lens is nearly parallel with respect to the surface of the optical memory medium.

Figure 7A:
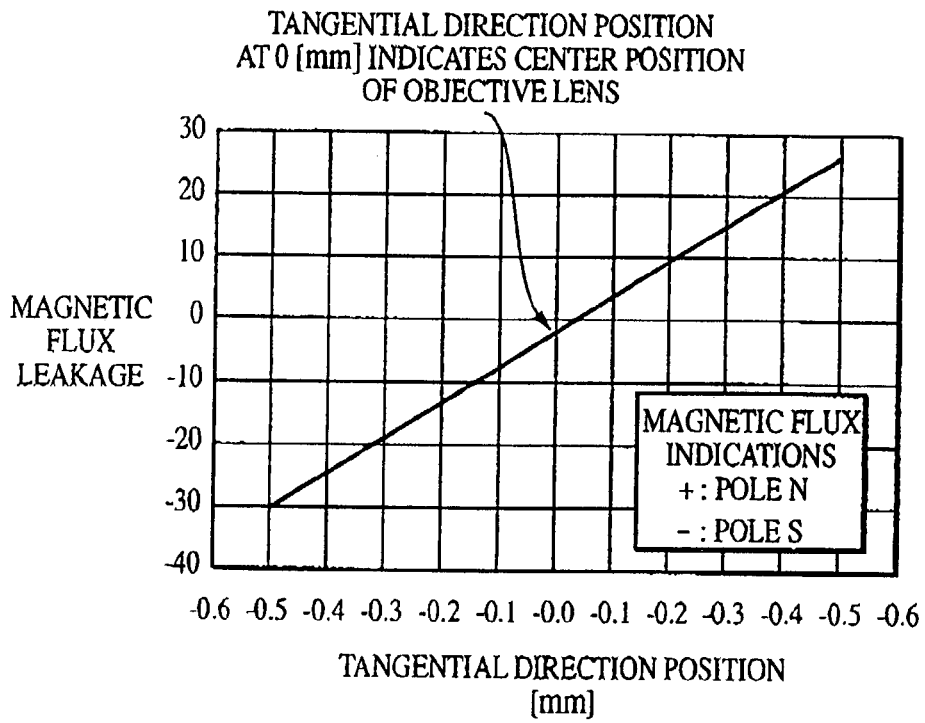
FIG. 7A is a graph that illustrates the relationship between the tangential direction position and the magnetic flux leakage.

FIG. 7A shows the relationship between the tangential direction position and the magnetic flux leakage. As shown in FIG. 7A, the tangential direction (Y-direction) is perpendicular with respect to the X-direction, which is the tracking direction (carriage movement direction). The tangential direction is also nearly parallel to the surface of the optical memory medium.

Based on the composition described in the embodiment above, given a tangential direction position of 0 mm, namely the center position of the objective lens, the magnetic flux leakage is approximately −2.45 Oe, or approximately $-2.45 \times 10^3/4\pi$ (79) A/m, which is a value close to 0 ($\times 10^3/4\pi$ 79 A/m).

Figure 7B:
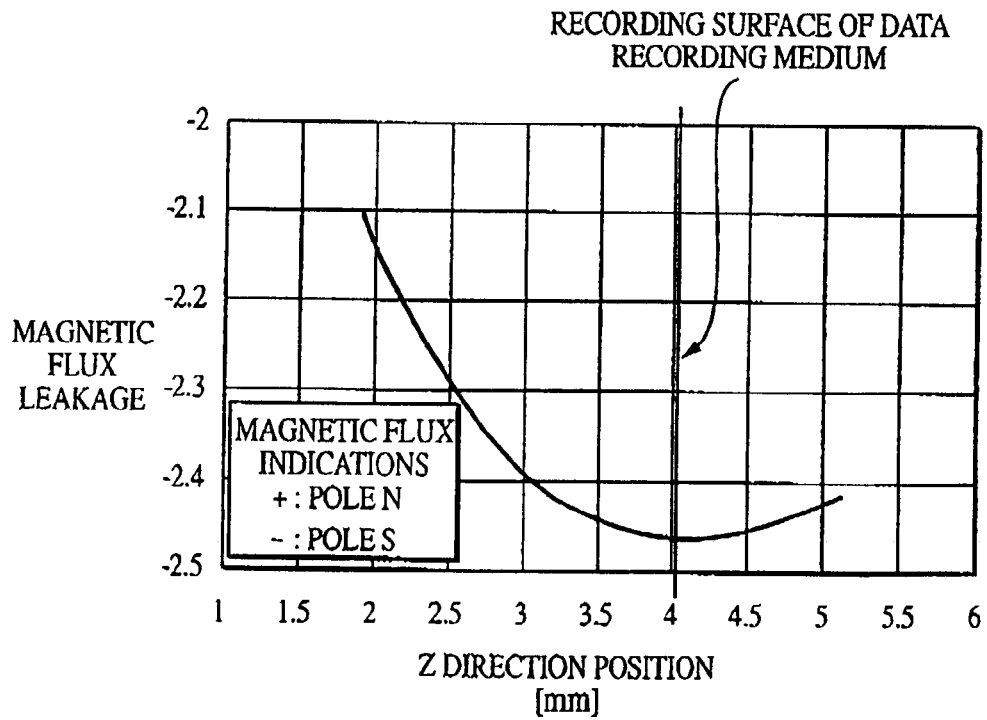
FIG. 7B is a graph that illustrates the relationship between the Z-direction position and the magnetic flux leakage.

FIG. 7B shows the relationship between the Z-direction position and the magnetic flux leakage. As shown in FIG. 7B, the Z-direction is nearly parallel to the focusing direction, or the direction of the optical axis. According to this embodiment, the distance from the objective lens to the recording surface of the data recording medium is set to approximately 4.1 mm. Therefore, given the position, the magnetic flux leakage is approximately −2.45 ($\times 10^3/4\pi$ 79 A/m), which is a value close to 0 ($\times 10^3/4\pi$ 79 A/m). Within a range in which the size of the objective lens 5 is considered, the value is held to a maximum of nearly ±10 (×$10^3$/4π 79 A/m) in any direction.

Furthermore, if the maximum size of the magnetic flux leakage is 10 (×$10^3$/4π 79 A/m), the bias magnetic field applicator 31 has a small effect on the magnetic fields such as recording/erasing, and there is no longer a need for generating a magnetic field in order to compensate for the magnetic flux leakage.

Note that the aforementioned measurements were conducted under the following preferred design conditions by the present inventors. Other conditions are of course possible without departing from the present invention. The energy product of the magnets used for tracking are approximately 45 MOe, which is approximately 45×$10^3$/4π (79) MA/m, and the energy product of the magnets used for focusing are approximately 42 MOe, which is approximately 42×$10^3$/4π (79) MA/m. The horizontal distance from the left end of the yoke 14c to the right end of the yoke 14d is approximately 27.2 mm, and the horizontal distance from the right end of the magnet 15a used for tracking to the left end of the magnet 15b used for tracking is approximately 20.6 mm. The width of each magnet used for tracking is approximately 1 mm, with a height of approximately 3.9 mm, and the width of each yoke used for tracking is approximately 2.3 mm, with a height of approximately 3.9 mm.

The horizontal distance from the right end of the magnet 12a used for focusing to the left end of the magnet 12b used for focusing is approximately 6.3 mm, and the width of each magnet used for focusing is approximately 1 mm, with a height of approximately 2.8 mm. The width of each yoke used for focusing is approximately 0.6 mm, with a height of approximately 2.8 mm.

The horizontal distance from the left end of the yoke 19a used for focusing to the right end of the yoke 14a used for tracking is approximately 1.95 mm. In the same fashion, the horizontal distance from the right end of the yoke 19b used for focusing to the left end of the yoke 14b used for tracking is approximately 1.95 mm.

The lower end of the yoke used for focusing is higher than the center of the yoke used for tracking, and the amount of offset in the direction of the optical axis (perpendicular direction) from the lower end of the yoke used for tracking is approximately 2.6 mm. The upper end of the yoke used for focusing is approximately 1.5 mm from the upper end of the yoke used for tracking.

The aforementioned embodiment is explained in terms of an objective lens driver for a magneto-optical disk device. Note, however, that this invention is not limited to magneto-optical disk devices, but can also be applied in the case of a magneto-optical memory device in which magneto-optical memory media are handled in the form of cards, tapes, etc. Furthermore, this invention is also not limited to devices that correspond to magneto-optical memory media, but can also be applied in the case of optical memory devices in which other types of optical memory media are handled, including those in which unusual characteristics can develop when the memory medium is influenced by a magnetic field with a nearly perpendicular orientation with respect to the memory medium itself.

There is also no particular need for the magnetic field applicator 31 to be an electromagnet, but could also be in the form of a floating type or contact type thin-film magnetic head, a permanent magnet, or similar. In the case where a permanent magnet is used, there would be no need to use a large permanent magnet due to the effect that is achieved through the application of this invention, and it would thus be possible to design a smaller optical memory device for the task. Another advantage of being able to use a small permanent magnet is that it becomes possible to reduce the amount of electrical power needed for the motive drive mechanism in order to switch the permanent magnet between the N-pole and the S-pole. As a result, a design can be constructed in which a small amount of electric power is consumed.

The objective lens described in this invention is similarly not limited to optical memory devices, but can be applied to other types of optical devices such as microscopes.

Furthermore, there have been some ideas put forth recently for magnetic memory devices in which a light beam is used to apply heat to magnetic memory media in order to conduct thermal assist recording. In a similar fashion, the effects of magnetic flux leakage have been considered for these types of devices, and this invention has been found to be also effective in these cases, as well as being included in optical memory devices.

In the present invention and the described embodiments, even though the direction of the optical axis and the perpendicular direction to the optical axis are illustrated, there are devices that use a large number of parts, or there may be cases in which surface vibrations occur along the memory medium, and for these reasons there is room for variation with regard to specific directions based on the design of the device itself.

Figure 8A:
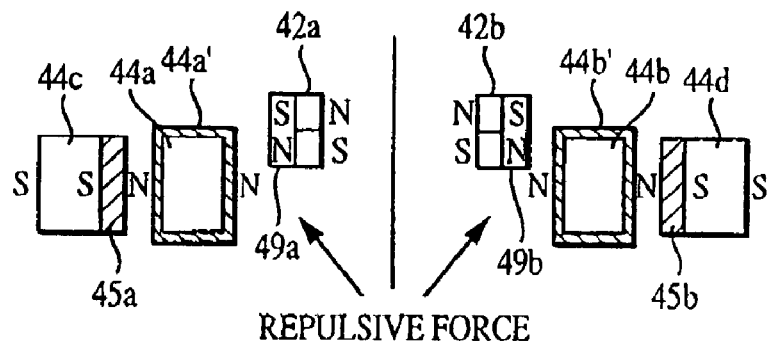
FIG. 8A is a layout drawing of the magnetic circuits used for focusing and tracking noted in Comparison Example No. 1.
Figure 8B:
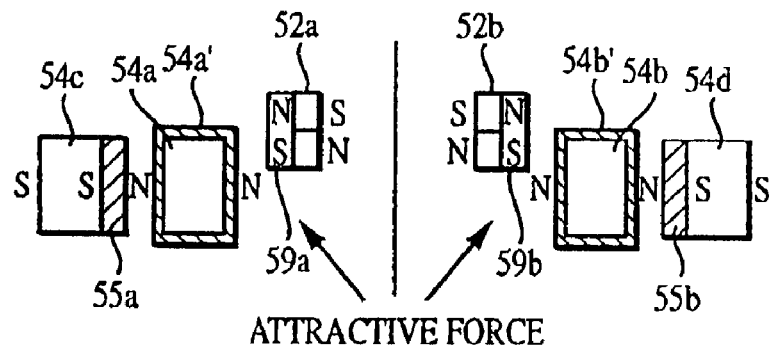
FIG. 8B is a layout drawing of the magnetic circuits used for focusing and tracking noted in Comparison Example No. 2.
Figure 8C:
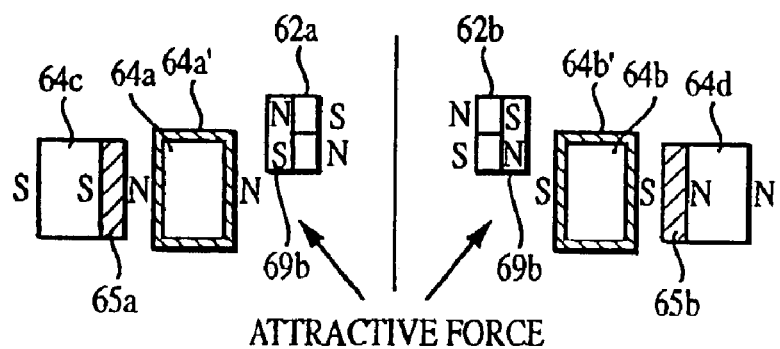
FIG. 8C is a layout drawing of the magnetic circuits used for focusing and tracking noted in Comparison Example No. 3.

FIGS. 8A–C are layout drawings showing comparative examples of magnetic circuits used for focusing and tracking. As shown in FIGS. 8A–8C, note that in Comparison Examples 1–3 respectively, the polarities of each magnet have been simplified for the magnetic circuits used for focusing and tracking with regard to the carriage as noted in FIGS. 3 and 4. The measuring conditions are preferably the same as previously discussed.

Comparison Example No. 1 shows a known conventional magnetic circuit configuration. As shown in FIG. 8A, in sequence from the left side of the drawing, a yoke 44c of the magnetic circuit used for tracking has an S-pole on the left and right sides, a magnet 45a has an S-pole to the left and an N-pole to the right, and a yoke 44a has an N-pole on the left and right sides. A top of a yoke 49a of the magnetic circuit used for focusing has an S-pole, and its bottom has an N-pole, while the top of the magnet 42a has an N-pole, and its bottom has an S-pole. Furthermore, a top of a magnet 42b of the magnetic circuit used for focusing has an N-pole, and its bottom has an S-pole, while a yoke 44b has an N-pole on the left and right sides. A magnet 45b has an N-pole to the left and an S-pole-to the right, while a yoke 44d has an S-pole on the left and right sides.

Note that the surfaces of the yokes 44a and 44b are covered with copper pipes 44a' and 44b' that are used in order to counter excessive current.

Accordingly, a first repulsive force works between the N-pole of the yoke 44a and the N-pole of the yoke 49a, while another repulsive force works between the N-pole of the yoke 44b and the N-pole of the yoke 49b. In addition, the center of the magnetic circuit used for focusing and the center of the magnetic circuit used for tracking become offset in the direction of the optical axis of the objective lens, which makes it possible to obtain a component for the directional force that opposes the gravitational force. Furthermore, the force that is exerted toward the guide rails is weakened, and a lifting force is generated that makes it possible to reduce the frictional force that occurs as a result of the sliding action of the carriage.

However, in this conventional configuration, the pair of magnets 45a and 45b of the magnetic circuit used for tracking are set up with the same polarity and face one another with the carriage between them. In addition, the pair of magnets 42a and 42b of the magnetic circuit used for focusing are set up with the same polarity and face one another with the lens holder between them. All yokes used for tracking and focusing are the same. Accordingly, magnetic flux leakage in the parallel direction with respect to the optical axis ends up occurring at a level of 70–100 ($\times 10^3/4\pi$ A/m) along the surface of the data recording medium near the objective lens.

As a result, there is a need to use a bias magnetic field applicator in order to generate a bias magnetic field such that the magnetic flux leakage of the magnetic circuit used for focusing and the magnetic flux leakage of the magnetic circuit used for tracking will cancel each other out.

In Comparison Example No. 2, as shown in FIG. 8B, in sequence from the left side of the drawing, a yoke 54c of the magnetic circuit used for tracking has an S-pole on the left and right sides, a magnet 55a has an S-pole to the left and an N-pole to the right, and a yoke 54a has an N-pole on the left and right sides. A top of a yoke 59a of the magnetic circuit used for focusing has an N-pole, and its bottom has an S-pole, while the top of the magnet 52a has an S-pole, and the bottom has an N-pole. Furthermore, a top of the magnet 52b of the magnetic circuit used for focusing has an S-pole, and its bottom has an N-pole, while the top of a yoke 59b has an N-pole, and its bottom has an S-pole. A yoke 54b of the magnetic circuit used for tracking has an N-pole on the left and right sides, while a magnet 55b has an N-pole on the left and an S-pole on the right, and a yoke 54d has an S-pole on the left and right sides.

Note that the surfaces of the yokes 54a and 54b are preferably covered with copper pipes 54a' and 54b' that are used in order to counter excessive current.

An attractive force works between the N-pole of the yoke 54a and the S-pole of the yoke 59a, as well as between the S-pole of the yoke 54b and the N-pole of the yoke 59b. Accordingly, the magnetic circuits used for focusing and tracking obtain a force component for the gravitational direction, and an offset occurs in the direction of the optical axis of the objective lens. This causes the exertion force against the guide rails to strengthen, which ends up causing an increase in the frictional force that occurs as a result of the sliding action of the carriage. This impedes the possibility for achieving stable, high-speed access. Furthermore, the need arises for electric power to drive the carriage in order to compensate for the friction.

Furthermore, the pair of magnets 55a and 55b of the magnetic circuit used for tracking are set up with the same polarity and face one another with the carriage between them. In addition, the pair of magnets 52a and 52b of the magnetic circuit used for focusing are set up with the same polarity and face one another with the lens holder between them. All yokes used for tracking and focusing are the same. Accordingly, as in the case of Comparison Example No. 1, magnetic flux leakage in the parallel direction with respect to the optical axis ends up occurring at a level of 70–100 ($\times 10^3/4\pi$ A/m) along the surface of the data recording medium near the objective lens.

As a result, there is a need to use a bias magnetic field applicator in order to generate a bias magnetic field such that the magnetic flux leakage of the magnetic circuit used for focusing and the magnetic flux leakage of the magnetic circuit used for tracking will cancel each other out.

In Comparison Example No. 3, as shown in FIG. 8C, in sequence from the left side of the drawing, a yoke 64c of the magnetic circuit used for tracking has an S-pole on the left and right sides, a magnet 65a has an S-pole to the left and an N-pole to the right, and a yoke 64a has an N-pole on the left and right sides. A top of a yoke 69a of the magnetic circuit used for focusing has an N-pole, and its bottom has an S-pole, while a top of a magnet 62a has an S-pole, and its bottom has an N-pole. Furthermore, a top of a magnet 62b of the magnetic circuit used for focusing has an N-pole, and its bottom has an S-pole, while a top of a yoke 69b has an S-pole, and its bottom has an N-pole. A yoke 64b of the magnetic circuit used for tracking has an S-pole on the left and right sides, while a magnet 65b has an S-pole on the left and an N-pole on the right, and a yoke 64d has an N-pole on the left and right sides.

Note that the surfaces of the yokes 64a and 64b are covered with copper pipes 64a' and 64b' that are used in order to counter excessive current.

The pair of magnets 65a and 65b of the magnetic circuit used for tracking are set up with different polarities and face one another with the carriage between them. In addition, the pair of magnets 62a and 62b of the magnetic circuit used for focusing are set up with the different polarities and face one another with the lens holder between them. Accordingly, it is possible to maintain the magnetic flux leakage in the parallel direction with respect to the optical axis at a maximum of about 10 ($\times 10^3/4\pi$ A/m) along the surface of the data recording medium near the objective lens.

However, an attractive force works between the N-pole of the yoke 64a and the S-pole of the yoke 69a, as well as between the S-pole of the yoke 64b and the N-pole of the yoke 69b. Accordingly, the magnetic circuits used for focusing and tracking obtain a force component for the gravitational direction, and an offset occurs in the direction of the optical axis of the objective lens. This causes the exertion force against the guide rails to strengthen, which causes an increase in the frictional force that occurs as a result of the sliding action of the carriage. As in the case of the No. 2 Comparison Example, this friction impedes the possibility for achieving stable, high-speed access, and creates a need for additional electric power to drive the carriage in order to compensate for the friction.

Thus, in the case of any of the comparison examples above, there is an effect with regard to magnetic flux leakage, as well as an effect on high-speed access, etc., and additional electric power consumption is still required in order to eliminate such problems.

As noted above, the present invention provides a means for improving the magnetic flux leakage condition of drive mechanisms in objective lens drivers and optical memory devices that use these drivers. Furthermore, the present invention reduces the influence of magnetic flux leakage on optical memory media and irradiated objects. In addition, by lightening the load that is exerted against the carriage, the present invention makes it possible to provide high-speed access for the carriage with only a low level of consumption power being used.

Furthermore, through the achievement of an objective lens driver with high-speed access capability, along with a magnetic field applicator that is small in size and uses a low level of consumption power, it also becomes possible to achieve a magneto-optical memory device with high-speed access capability and that is small in size and uses a low level of consumption power.

What is claimed is:

1. An objective lens driver, comprising:
a lens holder which holds an objective lens;
a lens actuator which supports said lens holder such that said lens holder can be moved in a parallel direction with respect to an optical axis of said objective lens;
a first pair of drive coils which generate a drive force to move said objective lens in said parallel direction with respect to said optical axis;
a first pair of magnetic circuits which face said first pair of drive coils;
a lens carriage in which said lens actuator and at least one of said first pair of magnetic circuits are mounted;
a second pair of drive coils which generate a drive force to move said lens carriage in a relatively perpendicular direction with respect to said optical axis; and
a second pair of magnetic circuits which face said second pair of drive coils,
wherein respective polarities of said first and second pairs of magnetic circuits are set such that a repulsive force therebetween works in a direction opposing the gravitational force, and
wherein respective differing polarities of said first magnetic circuits are set to face each other, and respective differing polarities of said second pair of magnetic circuits are also set to face each other.

2. The objective lens driver as in claim 1 wherein said first pair of magnetic circuits are respectively set with an S-pole and N-pole in said parallel direction with respect to said optical axis, and said second pair of magnetic circuits are respectively set with an S-pole and N-pole in said perpendicular direction with respect to said optical axis.

3. An optical memory device, comprising:
a lens holder which holds an objective lens;
a lens actuator which supports said lens holder such that said lens holder can be moved in a parallel direction with respect to an optical axis of said objective lens;
a first pair of drive coils which generate a drive force to move said objective lens in said parallel direction with respect to said optical axis;
a first pair of magnetic circuits which face said first pair of 1 drive coils;
a lens carriage in said lens actuator and at least one of said first pair of magnetic circuits are mounted;
a second pair of said drive coils which generate a drive force to move said lens carriage along a surface of a magneto-optical memory medium; and
a second pair of magnetic circuits which face said second pair of drive coils, and
wherein respective polarities of said first and second pairs of magnetic circuits are set such that a repulsive force works in a direction opposing gravitational force, and
wherein respective differing polarities of said pair of first magnetic circuits face each other, and respective differing polarities of said second magnetic circuits also face each other.

4. The optical memory device as in claim 3, wherein said first pair of magnetic circuits are respectively set with an S-pole and N-pole in said parallel direction with respect to said optical axis, and said pair of magnetic circuits are respectively set with an S-pole and N-pole in said perpendicular direction with respect to said optical axis.

5. The optical memory device as in claims 3 or 4, further as a magnetic field applicator which provides a magnetic field in said perpendicular direction with respect to said surface of the magneto-optical memory medium.

6. An objective lens driver, comprising:
a lens holder which holds an objective lens;
a lens actuator which supports said lens holder such that said lens holder can be moved in a parallel direction with respect to an optical axis of said objective lens;
a first pair of drive coils which generate a drive force to move said objective lens in said parallel direction with respect to said optical axis;
a first pair of magnetic circuits which face said first pair of drive coils, each of said first pair of magnetic circuits having an N-pole and an S-pole;
a lens carriage in which said lens actuator and at least one of said first pair of magnetic circuits are mounted;
a second pair of drive coils which generate a drive force to move said lens carriage in a relatively perpendicular direction with respect to said optical axis; and
a second pair of magnetic circuits which face said second pair of drive coils, each of said second pair of magnetic circuits having an N-pole and an S-pole,
wherein a pole closest to said objective lens on one of said first pair of magnetic circuits is different from a pole closest to said objective lens on the other of said first pair of magnetic circuits,
wherein a pole closest to said objective lens on one of said second pair of magnetic circuits is different from a pole closest to said objective lens on the other of said second pair of magnetic circuits.

7. The objective lens driver of claim 6, wherein on either side of said optical axis, a pole of one of said first pair of magnetic circuits nearest to one of said second pair of magnetic circuits on a same side of said optical axis is the same as a pole of said one of said second pair of magnetic circuits nearest to said one of said first magnetic circuits on said same side.

* * * * *